United States Patent
Chendamarai Kannan et al.

(10) Patent No.: US 11,296,837 B2
(45) Date of Patent: Apr. 5, 2022

(54) PHYSICAL BROADCAST CHANNEL (PBCH) TRANSMISSION AND RECEPTION ON A SHARED COMMUNICATION MEDIUM

(71) Applicant: QUALCOMM Incorporated, San Diego, CA (US)

(72) Inventors: Arumugam Chendamarai Kannan, San Diego, CA (US); Tao Luo, San Diego, CA (US); Chirag Sureshbhai Patel, San Diego, CA (US); Tamer Adel Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 413 days.

(21) Appl. No.: 15/417,137

(22) Filed: Jan. 26, 2017

(65) Prior Publication Data

US 2017/0222771 A1 Aug. 3, 2017

Related U.S. Application Data

(60) Provisional application No. 62/288,405, filed on Jan. 28, 2016.

(51) Int. Cl.
*H04L 5/00* (2006.01)
*H04W 84/04* (2009.01)
(Continued)

(52) U.S. Cl.
CPC .......... *H04L 5/0032* (2013.01); *H04H 20/18* (2013.01); *H04L 1/0083* (2013.01);
(Continued)

(58) Field of Classification Search
None
See application file for complete search history.

(56) References Cited

U.S. PATENT DOCUMENTS 8,223,625 B2   7/2012   Malladi et al.
8,837,380 B2   9/2014   Montojo et al.
(Continued)

FOREIGN PATENT DOCUMENTS

JP   2017503386 A   1/2017
JP   2017512438 A   5/2017
(Continued)

OTHER PUBLICATIONS

Acharya J., et al: "Chapter 4: Physical Layer Signal Processing in LTE" In: "Heterogeneous Networks in LTE-Advanced," Mar. 14, 2014 (Mar. 14, 2014), John Wiley & Sons, Ltd, XP055355432, ISBN: 978-1-118-51186-2 pp. 73-77, p. 74; figure 4.1.
(Continued)

*Primary Examiner* — Gregory B Sefcheck
*Assistant Examiner* — Suk Jin Kang
(74) *Attorney, Agent, or Firm* — Muncy, Geissler, Olds & Lowe, P.C.

(57) ABSTRACT

Techniques for broadcast channel management on a shared communication medium are disclosed. An access terminal may be configured to identify a subframe number associated with a given subframe based not only on a subframe number indicator but also a reference boundary. Conversely, an access point may be configured to set a subframe number indicator for a given subframe based not only on its subframe number but also a reference boundary.

44 Claims, 9 Drawing Sheets

(51) Int. Cl.
*H04L 1/00* (2006.01)
*H04W 28/04* (2009.01)
*H04H 20/18* (2008.01)
*H04W 48/16* (2009.01)
*H04W 48/10* (2009.01)

(52) U.S. Cl.
CPC .......... *H04L 5/0048* (2013.01); *H04W 28/04* (2013.01); *H04W 48/16* (2013.01); *H04W 84/045* (2013.01); *H04W 48/10* (2013.01)

(56) References Cited

U.S. PATENT DOCUMENTS

| | | | | |
|---|---|---|---|---|
| 2011/0007658 | A1* | 1/2011 | Lindoff | H04L 27/2647 370/252 |
| 2011/0103350 | A1* | 5/2011 | Lindoff | H04W 36/0094 370/332 |
| 2013/0039268 | A1* | 2/2013 | Blankenship | H04W 56/0015 370/328 |
| 2013/0250847 | A1* | 9/2013 | Lee | H04L 5/0051 370/315 |
| 2014/0098761 | A1* | 4/2014 | Lee | H04W 74/006 370/329 |
| 2014/0161100 | A1* | 6/2014 | Velde | H04W 36/0072 370/331 |
| 2014/0206341 | A1* | 7/2014 | Siomina | H04W 36/0085 455/422.1 |
| 2015/0063344 | A1* | 3/2015 | Chen | H04W 56/0015 370/350 |
| 2015/0103800 | A1* | 4/2015 | Seo | H04W 48/10 370/330 |
| 2015/0139113 | A1 | 5/2015 | You et al. | |
| 2015/0264636 | A1 | 9/2015 | Han et al. | |
| 2015/0271864 | A1* | 9/2015 | Nigam | H04W 48/16 370/252 |
| 2015/0289141 | A1* | 10/2015 | Ghasemzadeh | H04W 16/14 370/330 |
| 2015/0358945 | A1* | 12/2015 | Susitaival | H04W 48/16 370/329 |
| 2015/0358957 | A1* | 12/2015 | Kim | H04L 5/0098 455/450 |
| 2015/0358975 | A1 | 12/2015 | Yang et al. | |
| 2016/0050534 | A1* | 2/2016 | Lim | G01S 5/0236 370/252 |
| 2016/0057562 | A1* | 2/2016 | Fang | H04W 72/044 370/329 |
| 2016/0081111 | A1* | 3/2016 | Yl | H04W 76/28 370/280 |
| 2016/0205648 | A1* | 7/2016 | Kim | H04W 72/042 370/350 |
| 2016/0234762 | A1* | 8/2016 | You | H04J 11/0056 |
| 2016/0249364 | A1* | 8/2016 | Siomina | H04W 72/082 |
| 2016/0308637 | A1* | 10/2016 | Frenne | H04J 11/0069 |
| 2016/0353433 | A1* | 12/2016 | Roh | H03M 13/2966 |
| 2016/0381689 | A1* | 12/2016 | Seo | H04L 5/001 370/280 |
| 2017/0070312 | A1* | 3/2017 | Yl | H04J 11/0036 |
| 2017/0150462 | A1* | 5/2017 | Zeng | H04W 24/00 |
| 2017/0164247 | A1* | 6/2017 | Wiemann | H04W 36/0066 |
| 2017/0195902 | A1* | 7/2017 | Nigam | H04W 48/16 |
| 2017/0238272 | A1* | 8/2017 | You | H04J 11/0073 370/350 |
| 2017/0251454 | A1* | 8/2017 | Yang | H04B 7/26 |
| 2017/0294997 | A1* | 10/2017 | Lee | H04L 5/0016 |
| 2017/0303304 | A1* | 10/2017 | Lee | H04W 72/12 |
| 2018/0007495 | A1* | 1/2018 | Martin | H04L 67/1097 |
| 2018/0014278 | A1* | 1/2018 | Papasakellariou | H04L 5/14 |
| 2018/0109912 | A1* | 4/2018 | Kang | H04L 1/08 |
| 2018/0309611 | A1* | 10/2018 | Ko | H04J 11/0073 |
| 2018/0359790 | A1* | 12/2018 | Ingale | H04W 8/24 |
| 2019/0007896 | A1* | 1/2019 | Ye | H04L 5/0053 |
| 2019/0090219 | A1* | 3/2019 | Lee | H04W 74/006 |
| 2019/0159172 | A9* | 5/2019 | Papasakellariou | H04L 5/14 |
| 2019/0281599 | A1* | 9/2019 | Kim | H04L 5/0058 |
| 2020/0112985 | A1* | 4/2020 | Noh | H04L 5/005 |

FOREIGN PATENT DOCUMENTS

| | | |
|---|---|---|
| WO | 2008024938 | 2/2008 |
| WO | 2008057898 | 5/2008 |
| WO | 2011009363 A1 | 1/2011 |
| WO | 2014181443 A1 | 11/2014 |
| WO | 2015080646 A1 | 6/2015 |
| WO | 2015133823 A1 | 9/2015 |

OTHER PUBLICATIONS

Elnashar A., et al., "Coverage and Capacity Planning of 4G Networks," In: "Design, Deployment and Performance of 4G-LTE Networks," May 31, 2014 (May 31, 2014), John Wiley & Sons, Ltd, Chichester, UK, XP055355443, ISBN: 978-1-118-68321-7 p. 34, p. 360.

ETRI: "DRS Transmission Over Unlicensed Carrier," 3GPP Draft; R1-155830-DRSTransmission Over Unlicensed Carrier, 3rd Generation Partnership Project (3GPP), Mobile Competence Centre ; 650 , Route Des Lucioles ; F-06921 Sophia-Antipolis Cedex ; France vol. Ran WG1, no. Malmö, Sweden; Oct. 5, 2015-Oct. 9, 2015 Oct. 4, 2015 (Oct. 4, 2015), XP051039757 Retrieved from the Internet: URL:http://www.3gpp.org/ftp/Meetings_3GPP_SYNC/RAN1/Docs/ [retrieved on Oct. 4, 2015].

International Search Report and Written Opinion —PCT/US2017/015289—ISA/EPO —Mar. 27, 2017 (161935WO).

Qualcomm Incorporated: "Remaining Details of Subframe Types," 3GPP Draft; R1-157043 Remaining Details of Subframe Types, 3rd Generation Partnership Project (3GPP), Mobile Competence Centre ; 650, Route Des Lucioles ; F-06921 Sophia-Antipolis Cedex ; France vol. RAN WG1, no. Anaheim, USA; Nov. 14, 2015-Nov. 22, 2015 Nov. 15, 2015 (Nov. 15, 2015), XP051003346 Retrieved from the Internet: URL:http://www.3gpp.org/ftp/Meetings_3GPP_SYNC/RAN1/Docs/[retrieved on Nov. 15, 2015], 4 pages.

ZTE: "Discussion on Remaining Issues of DRS LBT Design," 3GPP Draft; R1-156985 Discussion on Remaining Issues of DRS LBT Design, 3rd Generation Partnership Project (3GPP), Mobile Competence Centre ; 650 , Route Des Lucioles ; F-06921 Sophia-Antipolis Cedex vol. RAN WG1, no. Anaheim, USA; Nov. 15, 2015-Nov. 22, 2015 Nov. 15, 2015 (Nov. 15, 2015), XP051039981 Retrieved from the Internet: URL:http://www.3gpp.org/ftp/Meetings_3GPP_SYNC/RAN1/Docs/ [retrieved on Nov. 15, 2015], 6 pages.

CATT: "Design of LAA DRS [online]," 3GPP Draft, 3GPP TSG RAN WG1 Meeting #82, R1-153923, 3rd Generation Partnership Project (3GPP), Mobile Competence Centre, 650, Route Des Lucioles, F-06921 Sophia-Antipolis Cedex, France, vol. RAN WG1. No. Beijing, China, Aug. 24-2015-Aug. 28, 2015 Aug. 23, 2015 (Aug. 23, 2015), XP051001353, 4 Pages, Retrieved from the Internet URL:http://www.3gpp.org/ftp/tsg_ran/WG1_RL1/TSGR1_82/Docs/R1-153923.zip.

Intel: "DRS Design Options for LAA Downlink," 3GPP TSG RAN WG1 Meeting #80 R1-150506 Athens, Greece, Feb. 9-13, 2015, 3 pages.

Qualcomm Incorporated: "Discussion on LS on Gap handling for Sidelink Discovery [online]", 3GPP Draft, 3GPP TSG-RAN WG4#76bis, R4-155557, Sophia Antipolis, France, October 12-16, 2015, pp. 1-10, Retrieved from the Internet: URL:http://www.3gpp.org/ftp/tsg_ran/WG4_Radio/TSGR4_76bis/Docs/R4-155557.zip.

ZTE: "Details of DRS Design for LAA", 3GPP Draft, 3GPP TSG RAN WG1 Meeting #82bis, R1-155533 Details of DRS Design For LAA, 3rd Generation Partnership Project (3GPP), Mobile Competence Centre, 650, Route Des Lucioles, F-06921 Sophia-Antipolis Cedex, France, vol. RAN WG1, No. Malmo, Sweden, Oct. 5, 2015-Oct. 9, 2015, Oct. 4, 2015 (Oct. 4, 2015), XP051002414, 10 Pages, Retrieved from the Internet: URL: http://www.3gpp.org/ftp/Meetings_3GPP_SYNC/RAN1/Docs/ [retrieved on Oct. 4, 2015] figure 1 p. 1-p. 2.

(56) References Cited

OTHER PUBLICATIONS

ZTE: "Discussion on RRM Measurement and DRS Design for LAA," 3GPP TSG RAN WG1 Meeting #80bis R1-151806 Belgrade, Serbia, Apr. 20-24, 2015, 5 pages.
Qualcomm Incorporated: "Discovery and RRM Procedure for LAA", 3GPP Draft, 3GPP TSG RAN WG1 #83, R1-157041, Discovery and RRM Procedure for LAA, Anaheim, USA, , Nov. 14, 2015-Nov. 22-2015, Nov. 15, 2015 (Nov. 15, 2015), XP051003344, 5 pages, Retrieved from the Internet on Nov. 15, 2015, URL: http://www.3gpp.org/ftp/Meetings_3GPP_SYNC/RAN1/Docs/.

* cited by examiner

PHYSICAL BROADCAST CHANNEL (PBCH) TRANSMISSION AND RECEPTION ON A SHARED COMMUNICATION MEDIUM

CROSS-REFERENCE TO RELATED APPLICATIONS

The present application claims the benefit of U.S. Provisional Application No. 62/288,405, entitled "Physical Broadcast Channel (PBCH) Transmission and Reception on a Shared Communication Medium," filed Jan. 28, 2016, assigned to the assignee hereof and expressly incorporated herein by reference in its entirety.

BACKGROUND

Aspects of this disclosure relate generally to telecommunications, and more particularly to operations on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as $5^{th}$ Generation (5G)/New Radio (NR), Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell operations have been extended into so-called "unlicensed" and "lightly licensed" frequency spectra, for example, such as the Unlicensed National Information Infrastructure (U-NII) band and the Citizens Broadband (CB) Radio Service band. This extension of small cell operation is designed to increase spectral efficiency and hence overall system capacity. However, it may also lead to varying degrees of interference between small cell access points and operators as their devices compete for access to shared resources.

SUMMARY

The following summary is an overview provided solely to aid in the description of various aspects of the disclosure and is provided solely for illustration of the aspects and not limitation thereof.

In one example, a communication method is disclosed. The method may include, for example, receiving, via a broadcast channel, a subframe number indicator for a corresponding subframe in which the broadcast channel is received; determining a reference boundary for the subframe number indicator within a corresponding radio frame that includes the subframe; and identifying a subframe number associated with the subframe based on the subframe number indicator and the reference boundary.

In another example, a communication apparatus is disclosed. The apparatus may include, for example, at least one processor, at least one memory coupled to the at least one processor, and at least one transceiver. The at least one transceiver may be configured to receive, via a broadcast channel, a subframe number indicator for a corresponding subframe in which the broadcast channel is received. The at least one processor and the at least one memory may be configured to determine a reference boundary for the subframe number indicator within a corresponding radio frame that includes the subframe, and identify a subframe number associated with the subframe based on the subframe number indicator and the reference boundary.

In another example, another communication apparatus is disclosed. The apparatus may include, for example, means for receiving, via a broadcast channel, a subframe number indicator for a corresponding subframe in which the broadcast channel is received; means for determining a reference boundary for the subframe number indicator within a corresponding radio frame that includes the subframe; and means for identifying a subframe number associated with the subframe based on the subframe number indicator and the reference boundary.

In another example, a transitory or non-transitory computer-readable medium is disclosed, which, when executed by at least one processor, causes the at least one processor to perform operations for communication. The computer-readable medium may include, for example, code for receiving, via a broadcast channel, a subframe number indicator for a corresponding subframe in which the broadcast channel is received; code for determining a reference boundary for the subframe number indicator within a corresponding radio frame that includes the subframe; and code for identifying a subframe number associated with the subframe based on the subframe number indicator and the reference boundary.

In another example, another communication method is disclosed. The method may include, for example, identifying a subframe number associated with a corresponding subframe designated to carry a broadcast channel; determining a reference boundary for the subframe within a corresponding radio frame that includes the subframe; setting a subframe number indicator for the subframe based on the subframe number and the reference boundary; and transmitting, via the broadcast channel, the subframe number indicator for the subframe.

In another example, another communication apparatus is disclosed. The apparatus may include, for example, at least one processor, at least one memory coupled to the at least one processor, and at least one transceiver. The at least one processor and the at least one memory may be configured to identify a subframe number associated with a corresponding subframe designated to carry a broadcast channel, determine a reference boundary for the subframe within a corresponding radio frame that includes the subframe, and set a subframe number indicator for the subframe based on the subframe number and the reference boundary. The at least one transceiver may be configured to transmit, via the broadcast channel, the subframe number indicator for the subframe.

In another example, another communication apparatus is disclosed. The apparatus may include, for example, means for identifying a subframe number associated with a corresponding subframe designated to carry a broadcast channel; means for determining a reference boundary for the subframe within a corresponding radio frame that includes the subframe; means for setting a subframe number indicator for the subframe based on the subframe number and the reference boundary; and means for transmitting, via the broadcast channel, the subframe number indicator for the subframe.

In another example, another transitory or non-transitory computer-readable medium is disclosed, which, when executed by at least one processor, causes the at least one processor to perform operations for communication. The computer-readable medium may include, for example, code for identifying a subframe number associated with a corresponding subframe designated to carry a broadcast channel; code for determining a reference boundary for the subframe within a corresponding radio frame that includes the subframe; code for setting a subframe number indicator for the subframe based on the subframe number and the reference boundary; and code for transmitting, via the broadcast channel, the subframe number indicator for the subframe.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The present disclosure relates generally to managing a Physical Broadcast Channel (PBCH) on a shared communication medium. For its part, an access point broadcasting information over the PBCH may configure the PBCH in different ways to account for contention-based processes for accessing the communication medium and to facilitate processing at one or more access terminals. For example, the PBCH may be configured to carry subframe numbering information, which may be conveyed as an offset with respect to a reference boundary. As other examples, the access point may increase and/or vary the number of symbol periods the PBCH occupies within a corresponding Discovery Reference Signal (DRS) subframe, restrict transmission of the PBCH based on the DRS subframe location within a larger radio frame, and mitigate potential collisions between the PBCH and other signaling within the DRS subframe. The access terminals may be configured to understand and/or take advantage of at least certain aspects of the PBCH configuration, as well as to perform other associated operations, such as redundancy version detection and combining.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
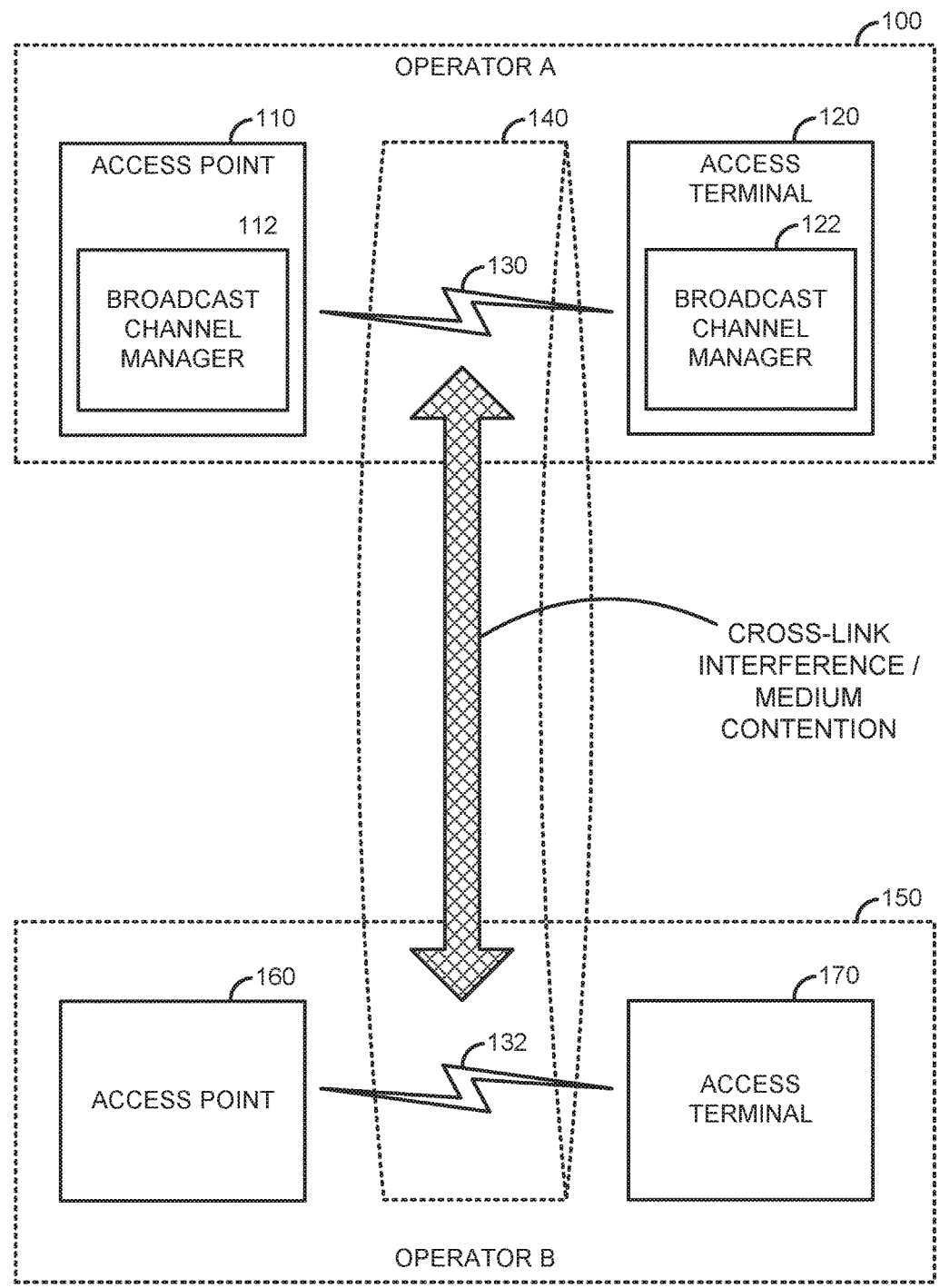
FIG. 1 is a system-level diagram illustrating an example wireless network environment.

FIG. 1 is a system-level diagram illustrating an example wireless network environment, shown by way of example as including systems from two operators, a first operator A system 100 and a second operator B system 150. Each system may be composed of different wireless nodes generally capable of receiving and/or transmitting over a wireless link, including information related to various types of communication (e.g., voice, data, multimedia services, associated control signaling, etc.). The operator A system 100 is shown as including an access point 110 and an access terminal 120 in communication with each other over a wireless link 130. The operator B system 150 is shown as including its own access point 160 and access terminal 170 in communication with each other over a separate wireless link 132.

As an example, the access point 110 and the access terminal 120 of the operator A system 100 may communicate via the wireless link 130 in accordance with a Long Term Evolution (LTE) technology or a variant thereof (e.g., MuLTEfire, Licensed Assisted Access (LAA), etc.), while the access point 160 and the access terminal 170 of the operator B system 150 may communicate via the wireless link 132 in accordance with the same LTE technology or a different technology (e.g., Wi-Fi technology) but be deployed by a different operator (e.g., a different company or other entity controlling authorization, system timing, etc.). It will be appreciated that each system may support any number of wireless nodes (access points, access terminals, etc.) distributed throughout a geographic region, with the illustrated entities being shown for illustration purposes only. Instead of LTE technology, persons skilled in the art will appreciate that communications via wireless links 130 and 132 may be configured in accordance with a fifth generation (5G)/new radio (NR) technology or a variant thereof, among others.

Unless otherwise noted, the terms "access terminal" and "access point" are not intended to be specific or limited to any particular Radio Access Technology (RAT). In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

Returning to FIG. 1, the wireless link 130 used by the operator A system 100 and the wireless link 132 used by the operator B system 150 may operate over a shared communication medium 140. A communication medium of this type may be composed of one or more frequency, time, and/or space communication resources (e.g., encompassing one or more channels across one or more carriers). As an example, the communication medium 140 may correspond to at least a portion of an unlicensed or lightly licensed frequency band. Although different licensed frequency bands have been reserved for certain communications (e.g., by a government entity such as the Federal Communications Commission (FCC) in the United States), some systems, in particular those employing small cell access points, have extended operation into unlicensed and lightly licensed frequency bands such as the Unlicensed National Information Infrastructure (U-NII) band and the Citizens Broadband (CB) Radio Service band.

Due to the shared use of the communication medium 140, there is the potential for cross-link interference between the wireless link 130 and the wireless link 132. Further, some RATs and some jurisdictions may require contention or "Listen Before Talk (LBT)" for arbitrating access to the communication medium 140. As an example, a Clear Channel Assessment (CCA) protocol may be used in which each device verifies via medium sensing the absence of other traffic on a shared communication medium before seizing (and in some cases reserving) the communication medium for its own transmissions. In some designs, the CCA protocol may include distinct CCA Preamble Detection (CCA-PD) and CCA Energy Detection (CCA-ED) mechanisms for yielding the communication medium to intra-RAT and inter-RAT traffic, respectively. The European Telecommunications Standards Institute (ETSI), for example, mandates contention for all devices regardless of their RAT on certain communication media such as unlicensed frequency bands.

As will be described in more detail below, the access point 110 and/or the access terminal 120 may be variously configured in accordance with the teachings herein to provide or otherwise support the broadcast channel management techniques discussed briefly above. For example, the access point 110 may include a broadcast channel manager 112 and the access terminal 120 may include a broadcast channel manager 122. The broadcast channel manager 112 and/or the broadcast channel manager 122 may be configured in different ways to manage transmission and reception of information.

Figure 2:
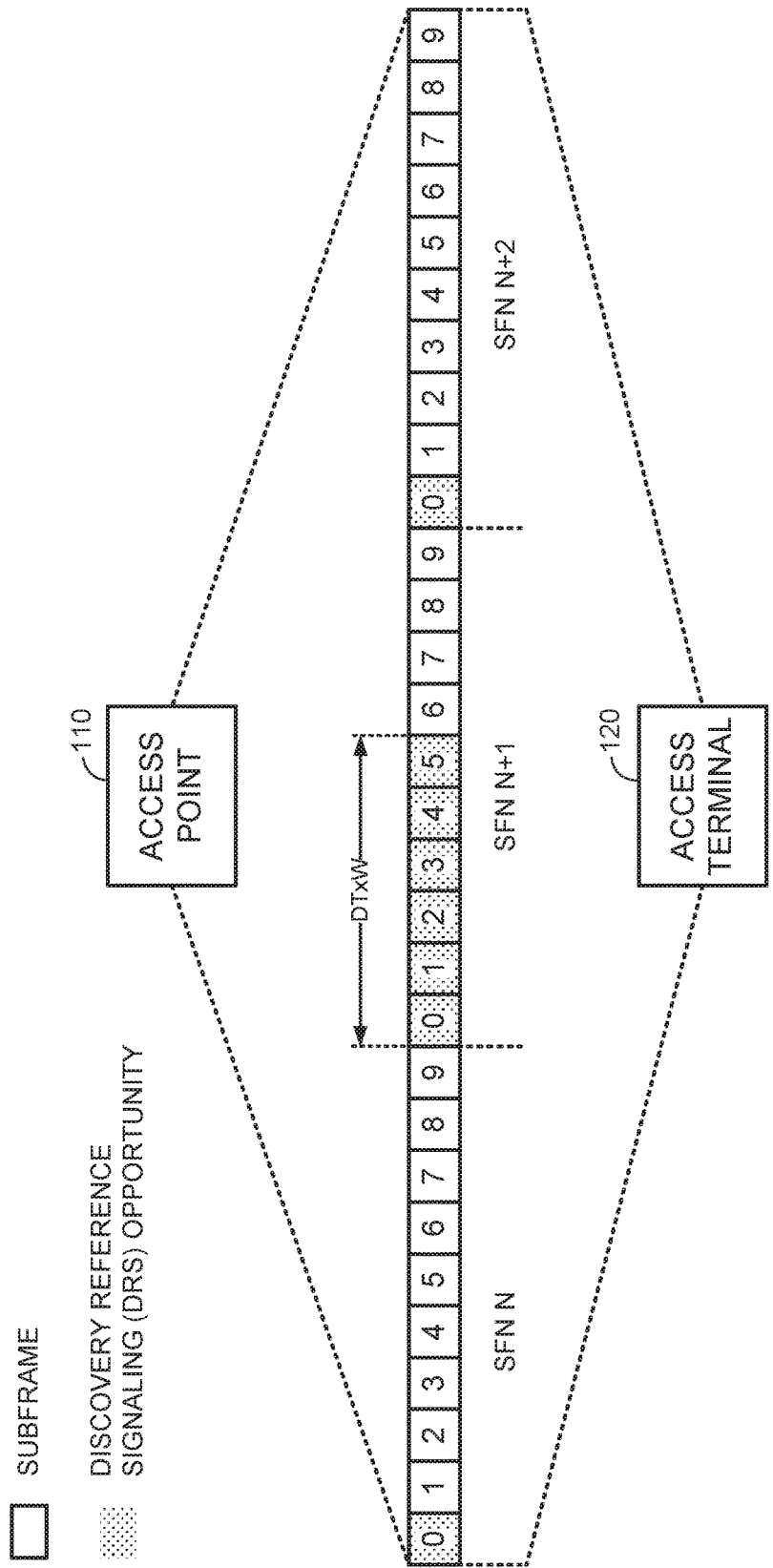
FIG. 2 illustrates an example frame structure including Discovery Reference Signal (DRS) transmission.

FIG. 2 illustrates an example frame structure that may be implemented for the operator A system 100 on the communication medium 140 to facilitate access to the communication medium 140.

The illustrated frame structure includes a series of radio frames (RFs) that are numbered in accordance with a system frame number numerology (SFN N, SFN N+1, SFN N+2, etc.) and divided into respective subframes (SFs), which may also be numbered for reference (e.g., SF0, SF1, etc.). Each respective subframe may be further divided into slots, and the slots may be further divided into symbol periods (not shown in FIG. 2). As an example, an LTE-based frame structure may include system frames that are divided into 1024 numbered radio frames composed of 10 subframes each, which together constitute a system frame cycle (e.g., lasting 10.24 s for 10 ms radio frames having 1 ms subframes). Moreover, each subframe may comprise two slots, and each slot may comprise six or seven symbol periods. The use of a frame structure may provide more natural and efficient coordination among devices than more ad hoc signaling techniques.

In general, the example frame structure of FIG. 2 may be implemented as a Frequency Division Duplex (FDD) frame structure or a Time Division Duplex (TDD) frame structure. In an FDD frame structure, each subframe on a given frequency may be statically configured for uplink (UL) communication for transmitting uplink information from the access terminal 120 to the access point 110 or for downlink (DL) communication for transmitting downlink information from the access point 110 to the access terminal 120. In a TDD frame structure, each subframe may be variously operated at different times as a downlink (D), uplink (U), or special (S) subframe. Different arrangements of downlink, uplink, and special subframes may be referred to as different TDD configurations.

In some designs, the frame structure of FIG. 2 may be "fixed" in that the location and/or configuration of each subframe may be predetermined (e.g., in relation to an absolute time). Here, if contention-based access is in effect and the access point 110 or the access terminal 120 fails to win contention for a given subframe, for example, that subframe may be silenced. In other designs, however, the frame structure of FIG. 2 may be "floating" in that the location and/or configuration of each subframe may be dynamically determined (e.g., in relation to the point at which access to the communication medium 140 is secured). As an example, the start of a given frame (e.g., SFN N+1) may be delayed in relation to an absolute time until the access point 110 or the access terminal 120 is able to win contention. As another example, the type of each subframe (downlink, uplink, or special) may be dynamically configured by the access point 110 based on when access to the communication medium 140 is secured (e.g., the next 10 subframes may be designated as DDDDDUUUUU, DDUUUUUUUU, or a different combination subframe types).

As is further illustrated in FIG. 2, one or more subframes may be designated to include what is referred to herein as Discovery Reference Signaling (DRS). The DRS may be configured to convey reference signaling for facilitating system operation. The reference signaling may include information relevant to timing synchronization, system acquisition, interference measurements (e.g., Radio Resource Management (RRM)/Radio Link Monitoring (RLM) measurements), tracking loops, gain reference (e.g., Automatic Gain Control (AGC)), paging, etc. As an example, the DRS may include a Primary Synchronization Signal (PSS) and a Secondary Synchronization Signal (SSS) for cell searching, a Cell-specific Reference Signal (CRS) for RRM, a Physical Broadcast Channel (PBCH) for conveying various access parameters, and so on.

Different DRS transmission schemes may be implemented to facilitate more robust DRS under different scenarios, such as when contention is required for accessing the communication medium 140. For example, the DRS may be scheduled for transmission periodically (e.g., every 10 ms) in a designated subframe(s) of each radio frame (e.g., subframe SF0) or in a range of such subframes referred to herein as a DRS Transmission Window (DTxW) defined around a designated subframe (e.g., spanning the first six subframes SF0 to SF5 of the radio frame). It will be appreciated that such a DTxW may also be referred to as a serving cell DRS Measurement Timing Configuration (DMTC) window or the like, depending on the RAT employed.

Figures 3, 4:
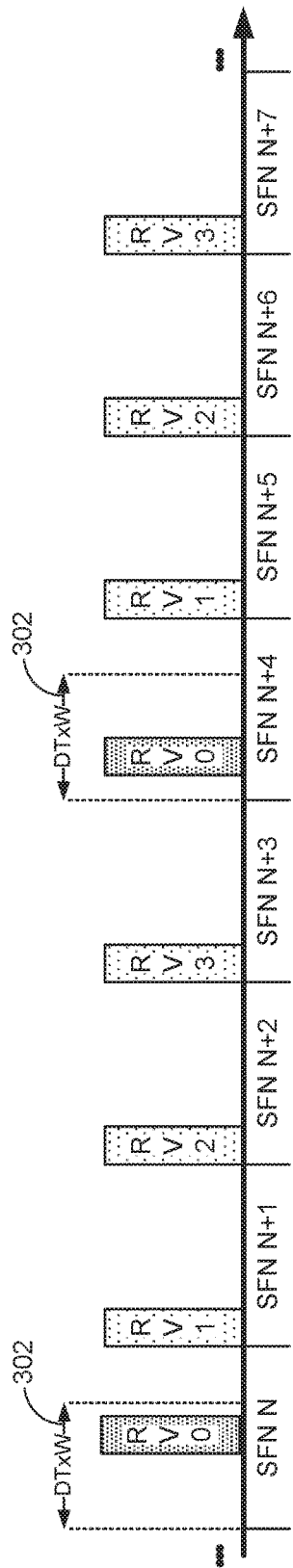
FIG. 3 is a timing diagram illustrating an example DRS transmission scheme.
FIG. 4 illustrates an example general DRS subframe structure.

FIG. 3 is a timing diagram illustrating an example DRS transmission scheme that may be implemented on the communication medium 140. As shown, in some instances, the access point 110 may transmit the DRS opportunistically in a designated subframe when access to the communication medium 140 is available for that designated subframe. Otherwise, when access to the communication medium 140 is not available for the designated subframe, the access point 110 may refrain from transmitting the DRS until the next designated subframe. Opportunistic DRS transmission at a designated subframe is shown by way of example in FIG. 3 at radio frames SFN N+1, SFN N+2, SFN N+3, SFN N+5, SFN N+6, and SFN N+7.

In other instances, however, the access point 110 may transmit the DRS more flexibly, at any time access to the communication medium 140 is available within a larger DTxW 302 defined around a designated subframe (e.g., spanning the first six subframes SF0 to SF5 of the radio frame). DRS transmission within the DTxW 302 is shown by way of example in FIG. 3 at radio frames SFN N and SFN N+4. The access terminal 120 may be configured to monitor the communication medium 140 for DRS within each defined DTxW 302.

The corresponding DTxW 302 may be scheduled periodically (e.g., every 20 or 40 ms) in designated radio frames, which can be coordinated with the access terminal 120. In the illustrated example, the DTxW 302 is scheduled every fourth radio frame at SFN N, SFN N+4, and so on. It will be appreciated, however, that other configurations may be employed as desired to balance the different DRS transmission schemes.

In either case, certain signaling included in the DRS may be transmitted with a corresponding redundancy version (RV), as appropriate, at least for an otherwise common payload. In the illustrated example, such signaling may be transmitted with a first redundancy version (RV0) in a first instance (SFN N within the DTxW 302), a second redundancy version (RV1) in the next instance (SFN N+1), a third redundancy version (RV2) in the next instance (SFN N+2), a fourth redundancy version (RV3) in the next instance (SFN N+3), and repeat from there as shown when the payload changes (e.g., every fourth radio frame). Use of different redundancy versions may allow for combining gains across time as well as other informational uses.

As will be described in more detail below, the PBCH that may be included in the DRS may be used to convey certain parameters related to accessing the access point 110, such as the downlink system bandwidth, the most significant bits of the system frame number, and so on. While PSS/SSS detection may allow the access terminal to synchronize its clock timing, the PBCH may provide additional information needed for identification of the system frame number and subframe number. Due to the shared nature of the communication medium 140, techniques for transmitting and receiving the PBCH within the DRS may be implemented in different ways.

In addition to the system frame number information and subframe number, the PBCH may also carry information on a technology identifier as well. Some of the reserved bits in the PBCH may be used to convey this information. For instance, some of the reserved bits may be used to indicate that the PBCH transmission corresponds to access point transmission based on a certain version of MuLTEfire technology as opposed to another technology operating in the same bandwidth.

FIG. 4 illustrates an example general DRS subframe structure that may be implemented for the operator A system 100. As shown, the DRS subframe structure 400 may include, in relevant part to the discussion here, a PBCH occupying one or more symbol periods (SPs). It will be appreciated that the PBCH may occupy predefined resource elements (REs) within the respective symbol periods (continuous or interlaced as desired), such as one or more of the REs constituting the center six resource blocks (RBs) of a given channel. It will also be appreciated that the specific symbol period locations shown in FIG. 4 are for illustration purposes only and may vary across different frame structures (e.g., FDD frame structures vs. TDD frame structures and so on).

In addition to conventional locations (e.g., SP-7, SP-8, SP-9, and SP-10), the PBCH may be extended to occupy additional symbol periods (e.g., SP-11, SP-4, SP-3, and/or SP-2). In the illustrated example, the PBCH may occupy anywhere from 4 to 8 symbol periods. As an example, to extend the PBCH from the conventional 4 symbol periods to 5 symbol periods, SP-11 may be employed for the PBCH in addition to SP-7, SP-8, SP-9, and SP-10. As another example, to extend the PBCH from the conventional 4 symbol periods to 6 symbol periods, SP-11 and SP-4 may be employed for the PBCH in addition to SP-7, SP-8, SP-9, and SP-10. As another example, to extend the PBCH from the conventional 4 symbol periods to 7 symbol periods, SP-11, SP-4, and SP-3 may be employed for the PBCH in addition to SP-7, SP-8, SP-9, and SP-10. As another example, to extend the PBCH from the conventional 4 symbol periods to 8 symbol periods, SP-11, SP-4, SP-3, and SP-2 may be employed for the PBCH in addition to SP-7, SP-8, SP-9, and SP-10.

In general, the increased number of symbol periods utilized for the PBCH may help to improve decoding by the access terminal 120 (e.g., by facilitating so-called "single-shot" decoding performance without relying on redundancy version combining). It may therefore be advantageous to utilize an increased number of symbol periods (e.g., 5 to 8 symbol periods) for all PBCH transmissions. In some designs, however, to preserve at least some instances of conventional (legacy) PBCH implementations, the conventional 4 symbol periods may be utilized for PBCH transmissions. For example, an increased number of 5 to 8 symbol periods may be utilized for the PBCH when associated with DRS transmissions within the DTxW 302, whereas the conventional 4 symbol periods may be utilized for the PBCH when associated with other, opportunistic DRS transmissions as described above with reference to FIG. 3. Here, the payload corresponding to each redundancy version may remain unchanged, but the resource elements used for transmission may be increased (thus enabling lower code rates and hence more reliable decoding). This also allows the access terminal 120 to distinguish between radio frames corresponding to DRS transmission within the DTxW 302 as compared to other DRS transmissions based on the number of symbol periods utilized for the PBCH.

For its part, when the access point 110 utilizes the approach described above in which an increased number of symbol periods is utilized for the PBCH when associated with DRS transmissions within the DTxW 302 as compared to other, opportunistic DRS transmissions, the access terminal 120 may determine whether the PBCH is part of the DTxW 302—and hence, which set of radio frames the PBCH may be associated with—based on the number of PBCH symbols detected. For example, the access terminal 120 may perform blind detection (multiple hypotheses testing) of the number of PBCH symbols. Depending on the number of PBCH symbols that yields the maximum reliability, the access terminal 120 may ascertain whether the PBCH was transmitted in the DTxW 302 or not. Blind detection of the DTxW 302 may also be performed using potentially different PSS waveforms within the DTxW 302 and outside the DTxW 302.

In some designs, the number of subframe locations in which the PBCH is transmitted may be restricted to simplify processing at the access terminal 120. For example, although the DTxW 302 may span a larger number of subframes of a given radio frame (e.g., the first six subframes SF0 to SF5), the PBCH may only be transmitted as part of a given DRS instance when that DRS instance occurs within a specific portion of the DTxW 302 (e.g., the first five subframes SF0 to SF4). Because the CRS scrambling code used in a DRS subframe, for example, follows SF0 scrambling if the DRS occurs in a first portion of the radio frame (SF0 to SF4) and SF5 scrambling otherwise (SF5 to SF9), this may allow the access terminal 120 to more easily determine the (single) CRS scrambling code to be used for PBCH decoding rather than blindly hypothesis testing across multiple CRS scrambling codes.

For its part, when the access point 110 utilizes the approach described above in which the number of subframe locations in which the PBCH is transmitted is restricted, the access terminal 120 may trigger PBCH decoding based on the corresponding SSS short code. The SSS short code may be taken as an indicator as to which portion of the radio frame is being transmitted, and hence, whether the PBCH is expected to be present. In general, the SSS transmission uses a first short code (Code 0) if it occurs within SF0 to SF4 and a second short code (Code 1) if it occurs within SF5 to SF9. The access terminal 120 may detect the PSS/SSS and determine if the SSS short code is Code 0 or Code 1. In this way, the access terminal 120 may trigger PBCH decoding only if the SSS short code is Code 0, indicating that the PBCH is expected to be present. Again, this approach removes the uncertainty in the CRS scrambling code that needs to be used for PBCH decoding, and simplifies processing at the access terminal 120.

In some implementations, the DTxW 302 may span a number of subframes that are larger than the number of bits reserved for the PBCH subframe can convey. For instance, if the length of the DTxW 302 is 12 or 16 subframes, and for instance, if the number of bits reserved for subframe indication in the PBCH payload is 3, then the entire subframe number may not be indicated by the range of the reserved bits since 3 bits can only indicate a maximum of 8 different subframes. In such instances, the access point may reset the subframe number indication at every SF0 or SF5 boundary, i.e., the offset of the current subframe may be indicated relative to the most recent SF0 boundary or SF5 boundary in a pre-determined fashion. For the access terminal's part, it may determine the most recent reference boundary being SF0 or SF5 blindly based on the SSS short code (Code 0 or Code 1) that is detected prior to PBCH processing.

Accordingly, based on the discussion above, it will be appreciated that the access point 110 and the access terminal 120 may identify a subframe number associated with a given subframe based not only on a subframe number indicator included in the PBCH but also a reference boundary, such that the subframe number indicator is interpreted as an offset with respect to the reference boundary.

Figure 5:
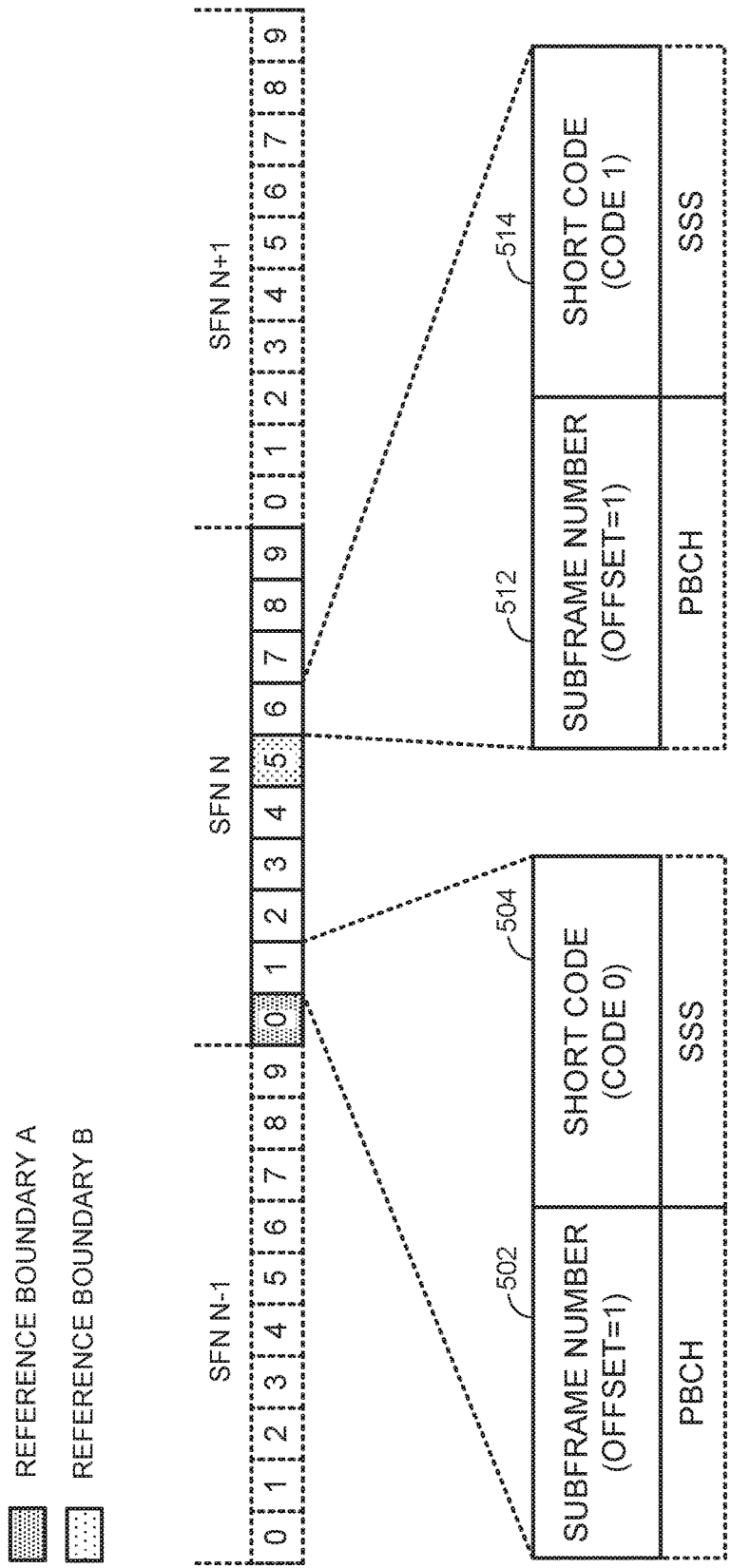
FIG. 5 is a timing diagram illustrating an example of subframe number identification.

FIG. 5 is a timing diagram illustrating an example of subframe number identification in accordance with the description above. In this example, a first subframe number indicator 502 and a first short code 504 are transmitted during a first subframe (e.g., SF1), via the PBCH and SSS, respectively. A second subframe number indicator 512 and a second short code 514 are transmitted during a second subframe (e.g., SF6), again via the PBCH and SSS, respectively. As shown, although the first subframe number indicator 502 and the second subframe number indicator 512 may have the same value (e.g., an offset=1 in the illustrated example), the two corresponding subframe numbers may be distinguished from one another by different reference boundaries (e.g., a first reference boundary A at SF0 based on the first short code 504 indicating Code 0 and a second reference boundary B at SF5 based on the second short code 514 indicating Code 1).

Returning again to FIG. 3, the PBCH redundancy version that is used for transmission within the DTxW 302 may be switched to RV1 instead of RV0 if the DRS instance within the DTxW 302 exceeds the boundary of SFN N and enters the boundary of SFN N+1. This operation is performed in order to allow the access terminal 120 to still determine the SFN without ambiguity.

In general, other signaling such as a Channel State Information Reference Signal (CSI-RS) may be transmitted on the same subframe as the PBCH and may in fact overlap on different symbol periods in that subframe (e.g., SP-9 and SP-10). Different techniques may be employed to avoid and/or mitigate resource element collisions with such signaling. As an example, the CSI-RS may be precluded from being transmitted on the same subframe as the PBCH. As another example, CSI-RS resource elements may be punctured (in favor of the PBCH) in a subframe where the PBCH is also present and overlapping. This may either be transparent to the access terminal 120 or implicitly assumed in the presence of the PBCH. Conversely, as another example, PBCH resource elements may be punctured (in favor of the CSI-RS) in a subframe where the CSI-RS is also present and overlapping. This is transparent to the access terminal 120 during initial acquisition, but may be implicitly assumed during later instances of the DRS. As a balance and a still further example, a subset of PBCH resource elements and a (non-overlapping) subset of CSI-RS resource elements may be punctured in the event of an overlap. This may be transparent to the access terminal 120, and allows a tradeoff in performance. (One of the subsets may be empty, as a special case.)

For its part, when the access point 110 utilizes the approaches described above for mitigating conflict with other DRS signaling such as CSI-RS, the access terminal 120 may operate in different ways. In general, when the access terminal 120 performs initial acquisition, it is unaware of CSI-RS presence, its configuration, etc., and it is hence the PBCH resource elements that may be impacted without the access terminal 120 knowing. In the designs described above where the PBCH is not punctured, there is no issue with the PBCH being impacted. In the other designs, however, some or all of the PBCH resource elements that overlap with the CSI-RS may be punctured, and this can impact initial acquisition as well as PBCH decoding in later instances. It will be appreciated, for example, that if the access terminal 120 ignores puncturing and attempts decoding, the loss using incorrect (punctured) resource elements is larger than simply ignoring the punctured resource elements. Accordingly, when the access terminal 120 is unaware of whether the CSI-RS punctures the PBCH, it may attempt multiple hypotheses testing on the presence/absence of CSI-RS puncturing to detect this blindly. In particular, multiple CSI-RS configurations may be blindly detected by the access terminal 120 to determine the presence/absence/extent of CSI-RS puncturing of the PBCH.

With reference again to FIG. 3, it will be appreciated that the PBCH in particular may employ different redundancy versions across DRS instances in the manner shown and discussed in more detail above. Upon initial acquisition, the access terminal 120 may perform blind detection of multiple PBCH redundancy version hypotheses to determine which redundancy version is detected at a given time and how to perform the decoding. For example, for an RV0 hypothesis at a given time t, the access terminal 120 may combine RV0 at the first instance (time t), RV1 at the next instance, RV2 at the next instance, and RV3 at the next instance; for an RV1 hypothesis at a given time t, the access terminal 120 may combine RV1 at the first instance (time t), RV2 at the next instance, and RV3 at the next instance; and so on. However, blind detection of all redundancy version hypotheses in PBCH decoding may result in a large number of possibilities, considering that the number of antennas needs to be blindly detected as well.

Accordingly, in some designs, redundancy version detection may be facilitated by the use of one or more reliability metrics to pare down the hypothesis testing. For example, the access terminal 120 may define a reliability metric from the set of log likelihood ratios (LLRs) associated with each redundancy version, such as from averaging the LLRs, from the distribution of LLRs, and/or from a comparison of the LLRs to a threshold. The access terminal 120 may then compute the reliability metric for each redundancy version as a function of the LLRs at every stage of detection and prune out a subset of redundancy version hypotheses. For example, at time 't', it may be determined that the RV1 and RV2 hypotheses are the most likely ones based on their reliability metrics. The access terminal 120 may then reject RV0 and RV3 hypotheses to reduce the number of hypotheses that remain at the next subframe (e.g., time t+10). Similar procedures may be applied for the number of antenna hypotheses, and likewise carried forward at the next subframe (time t+20) and finally the next subframe (time t+30).

In some scenarios, redundancy version combining may be impeded by the variable location of the PBCH within the DTxW 302 because the spacing between redundancy versions may be uncertain. For example, while the PBCH RV1, RV2, and RV3 may be spaced apart by a relatively precise duration (e.g., one subframe or 10 ms), their spacing with respect to the PBCH RV0 may vary by several subframe durations depending on where in the DTxW 302 the access point 110 is able to seize the communication medium 140. Accordingly, to mitigate the effect of this asymmetry between the PBCH RV0 and the PBCH RV1, RV2, and RV3 while still retaining at least partial combining gains, these sets of redundancy versions may be combined separately. For example, the access terminal 120 may combine redundancy versions of the PBCH only for RV1, RV2, and RV3 hypotheses, while RV0 is detected without combining. That is, for an RV0 hypothesis, the access terminal 120 may decode RV0 without combining. For an RV1 hypothesis, the access terminal 120 may combine RV1 at time 't', RV2 at the next instance (time t+10 ms), and RV3 at the next instance (time t+20 ms). For an RV2 hypothesis, the access terminal 120 may combine RV2 at time T and RV3 at the next instance (time t+10 ms). For an RV3 hypothesis, the access terminal 120 may decode RV3 at time T.

Figure 6:
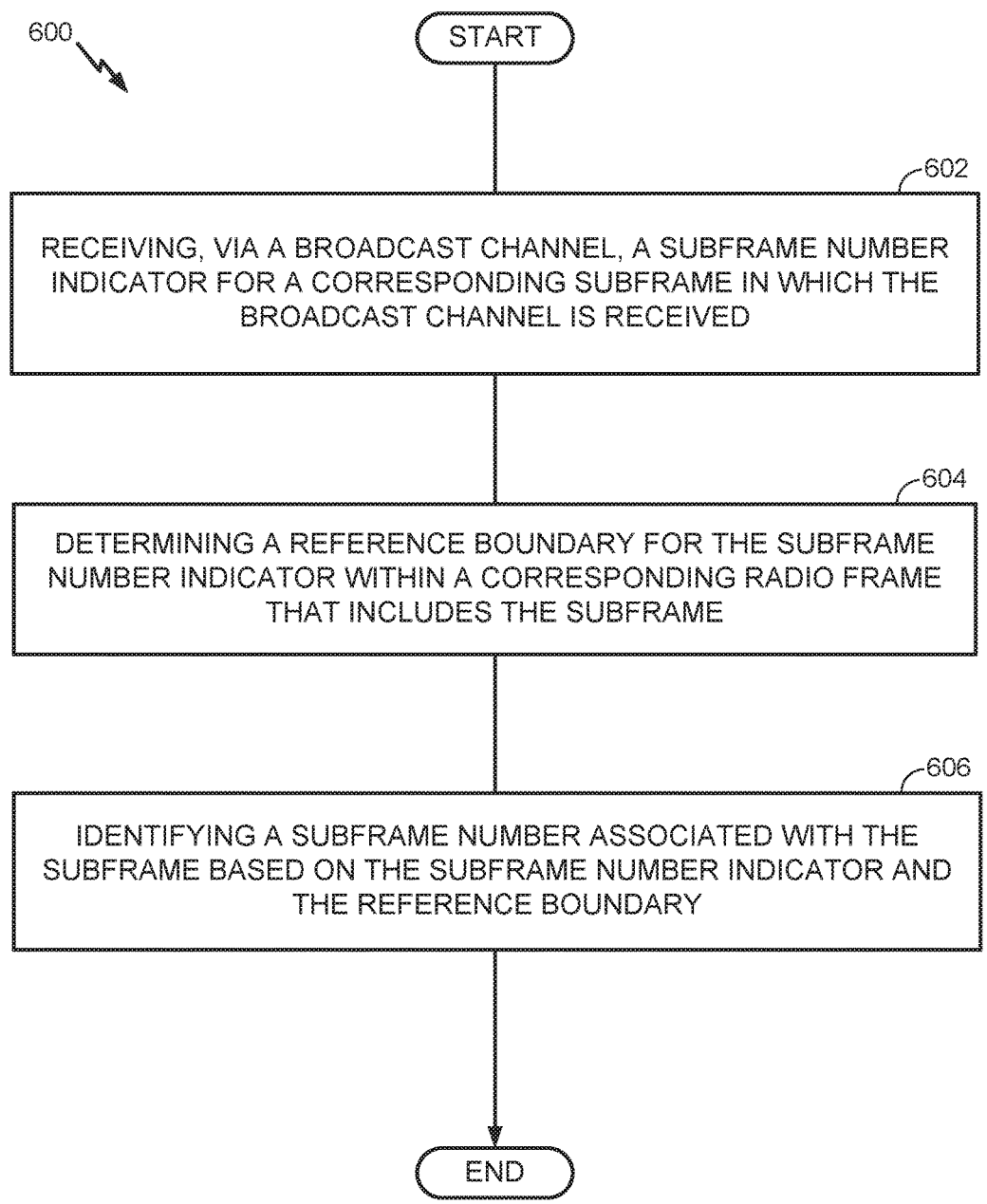
FIG. 6 is a flow diagram illustrating an example method of communication in accordance with the techniques described herein.

FIG. 6 is a flow diagram illustrating an example method of communication in accordance with the techniques described above. The method 600 may be performed, for example, by an access terminal (e.g., the access terminal 120 illustrated in FIG. 1) operating on a shared communication medium. As an example, the communication medium may include one or more time, frequency, or space resources on an unlicensed radio frequency band shared between LTE technology and Wi-Fi technology devices.

As shown, the access terminal may receive, via a broadcast channel, a subframe number indicator for a corresponding subframe in which the broadcast channel is received (block 602). The access terminal may determine a reference boundary for the subframe number indicator within a corresponding radio frame that includes the subframe (block 604). The access terminal may then identify a subframe number associated with the subframe based on the subframe number indicator and the reference boundary (block 606).

As discussed in more detail above, the identifying (block 606) may comprise interpreting the subframe number indicator as an offset within the radio frame with respect to the reference boundary.

The determining (block 604) may comprise, for example, receiving an SSS short code and determining the reference boundary based on a value of the SSS short code. As an example, the determining may more specifically comprise setting the reference boundary to a first subframe within a first portion of the radio frame based on a first value of the SSS short code and setting the reference boundary to a second subframe within a second portion of the radio frame based on a second value of the SSS short code. For a numbering of subframes within the radio frame of 0 through 9, the first subframe may correspond, for example, to subframe 0 (SF0), and the second subframe may correspond, for example, to subframe 5 (SF5).

In some designs, the broadcast channel may be received within a DTxW. The DTxW may, but need not necessarily, span a number of subframes that is greater than a number of subframes that can be uniquely conveyed by the subframe number indicator. For example, the subframe number indicator may correspond to three bits and the DTxW may span more than eight subframes.

In its greater context, it will be appreciated that the access terminal may adjust one or more timing parameters based on the identified subframe number. The access terminal may also detect PSS and SSS signaling, with the adjusting being further based on the detected PSS and SSS signaling.

Figure 7:
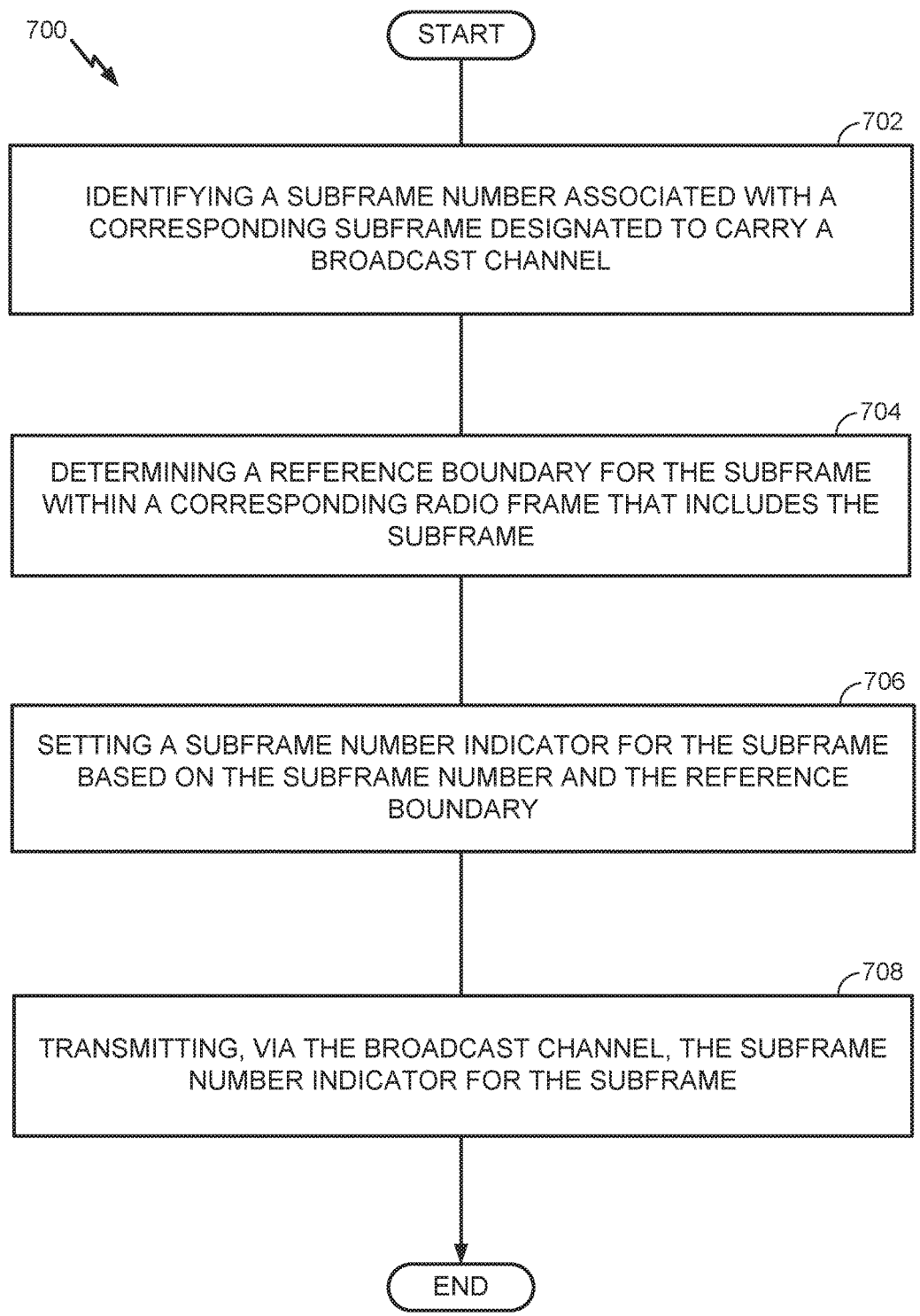
FIG. 7 is a flow diagram illustrating another example method of communication in accordance with the techniques described herein.

FIG. 7 is a flow diagram illustrating an example method of communication in accordance with the techniques described above. The method 700 may be performed, for example, by an access point (e.g., the access point 110 illustrated in FIG. 1) operating on a shared communication medium. As an example, the communication medium may include one or more time, frequency, or space resources on an unlicensed radio frequency band shared between LTE technology and Wi-Fi technology devices.

As shown, the access point may identify a subframe number associated with a corresponding subframe designated to carry a broadcast channel (block 702). The access point may determine a reference boundary for the subframe within a corresponding radio frame that includes the subframe (block 704). The access point may then set a subframe number indicator for the subframe based on the subframe number and the reference boundary (block 706) and transmit, via the broadcast channel, the subframe number indicator for the subframe (block 708).

As discussed in more detail above, the setting (block 706) may comprise calculating the subframe number indicator as an offset within the radio frame with respect to the reference boundary.

The determining (block 704) may comprise, for example, setting the reference boundary to a first subframe within a first portion of the radio frame or a second subframe within a second portion of the radio frame. As an example, for a numbering of subframes within the radio frame of 0 through 9, the first subframe may correspond to subframe 0 (SF0) and the second subframe may correspond to subframe 5 (SF5).

In some designs, the broadcast channel may be transmitted within a DTxW. The DTxW may, but need not necessarily, span a number of subframes that is greater than a number of subframes that can be uniquely conveyed by the subframe number indicator. For example, the subframe number indicator may correspond to three bits and the DTxW may span more than eight subframes.

For generality, the access point 110 and the access terminal 120 are shown in FIG. 1 only in relevant part as including the broadcast channel manager 112 and the broadcast channel manager 122, respectively. It will be appreciated, however, that the access point 110 and the access terminal 120 may be configured in various ways to provide or otherwise support the broadcast channel management techniques discussed herein.

Figure 8:
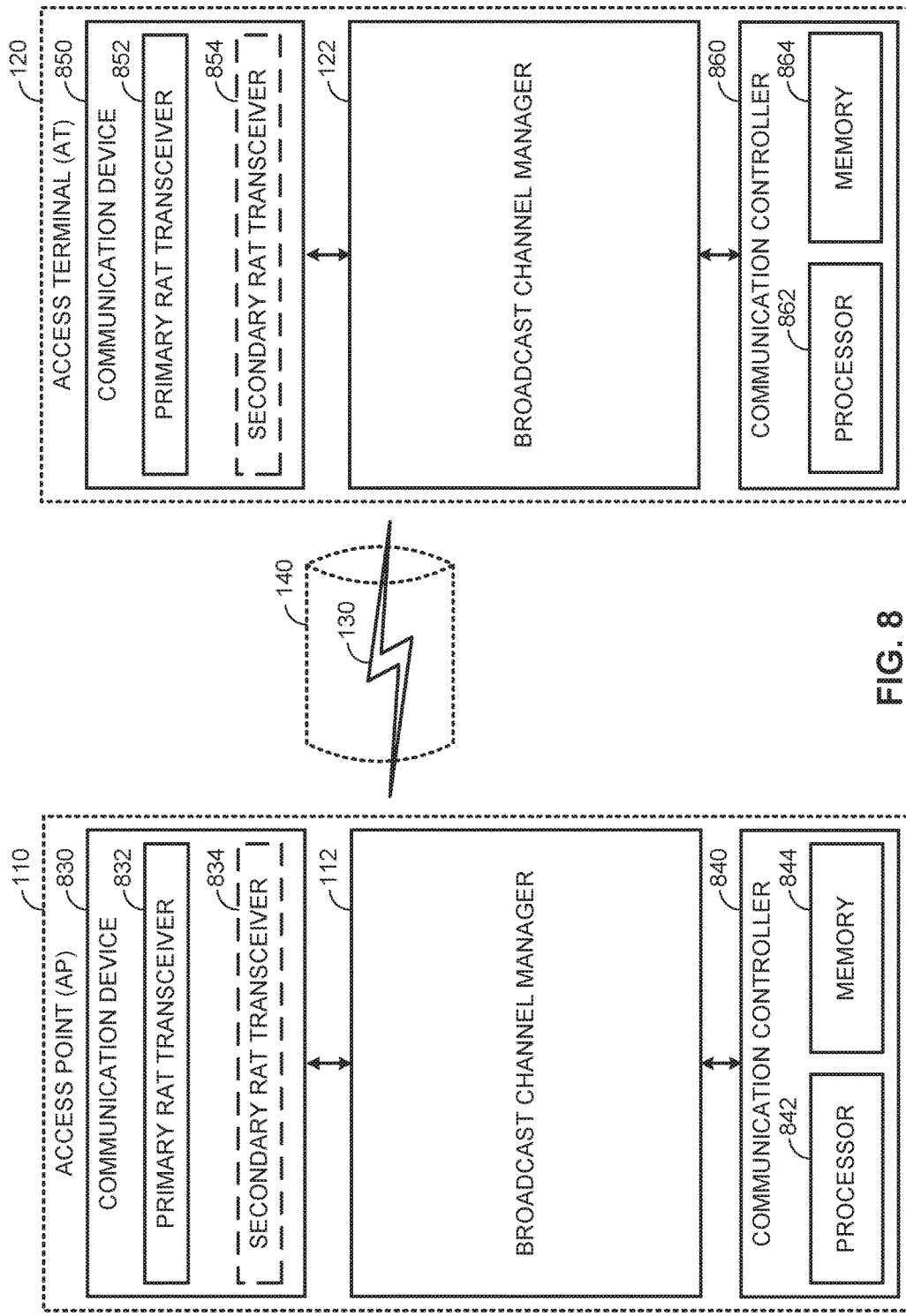
FIG. 8 is a device-level diagram illustrating example components of an access point and an access terminal in more detail.

FIG. 8 is a device-level diagram illustrating example components of the access point 110 and the access terminal 120 in more detail. As shown, the access point 110 and the access terminal 120 may each generally include a wireless communication device (represented by the communication devices 830 and 850) for communicating with other wireless nodes via at least one designated RAT. The communication devices 830 and 850 may be variously configured for transmitting and encoding signals, and, conversely, for receiving and decoding signals in accordance with the designated RAT (e.g., messages, indications, information, pilots, and so on).

The communication devices 830 and 850 may include, for example, one or more transceivers, such as respective primary RAT transceivers 832 and 852, and, in some designs, (optional) co-located secondary RAT transceivers 834 and 854, respectively (corresponding, for example, to the RAT employed by the operator B system 150, if different than the operator A system 100). As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry providing low-level sniffing only). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access point 110 and the access terminal 120 may also each generally include a communication controller (represented by the communication controllers 840 and 860) for controlling operation of their respective communication devices 830 and 850 (e.g., directing, modifying, enabling, disabling, etc.). The communication controllers 840 and 860 may include one or more processors 842 and 862, and one or more memories 844 and 864 coupled to the processors 842 and 862, respectively. The memories 844 and 864 may be configured to store data, instructions, or a combination thereof, either as on-board cache memory, as separate components, a combination, etc. The processors 842 and 862 and the memories 844 and 864 may be standalone communication components or may be part of the respective host system functionality of the access point 110 and the access terminal 120.

It will be appreciated that the broadcast channel manager 112 and the broadcast channel manager 122 may be implemented in different ways. In some designs, some or all of the functionality associated therewith may be implemented by or otherwise at the direction of at least one processor (e.g., one or more of the processors 842 and/or one or more of the processors 862), at least one memory (e.g., one or more of the memories 844 and/or one or more of the memories 864), at least one transceiver (e.g., one or more of the transceivers 832 and 834 and/or one or more of the transceivers 852 and 854), or a combination thereof. In other designs, some or all of the functionality associated therewith may be implemented as a series of interrelated functional modules.

Accordingly, it will be appreciated that the components in FIG. 8 may be used to perform operations described above with respect to FIGS. 1-7. For example, the access point 110 may, via the processor 842 and the memory 844, identify a subframe number associated with a corresponding subframe designated to carry a broadcast channel, determine a reference boundary for the subframe within a corresponding radio frame that includes the subframe, and set a subframe number indicator for the subframe based on the subframe number and the reference boundary. The access point 110 may, via the primary RAT transceiver 832, transmit, via the broadcast channel, the subframe number indicator for the subframe.

As another example, the access terminal 120 may, via the primary RAT transceiver 852, receive, via a broadcast channel, a subframe number indicator for a corresponding subframe in which the broadcast channel is received. The access terminal 120 may, via the processor 862 and the memory 864, determine a reference boundary for the subframe number indicator within a corresponding radio frame that includes the subframe, and identify a subframe number associated with the subframe based on the subframe number indicator and the reference boundary.

Figure 9:
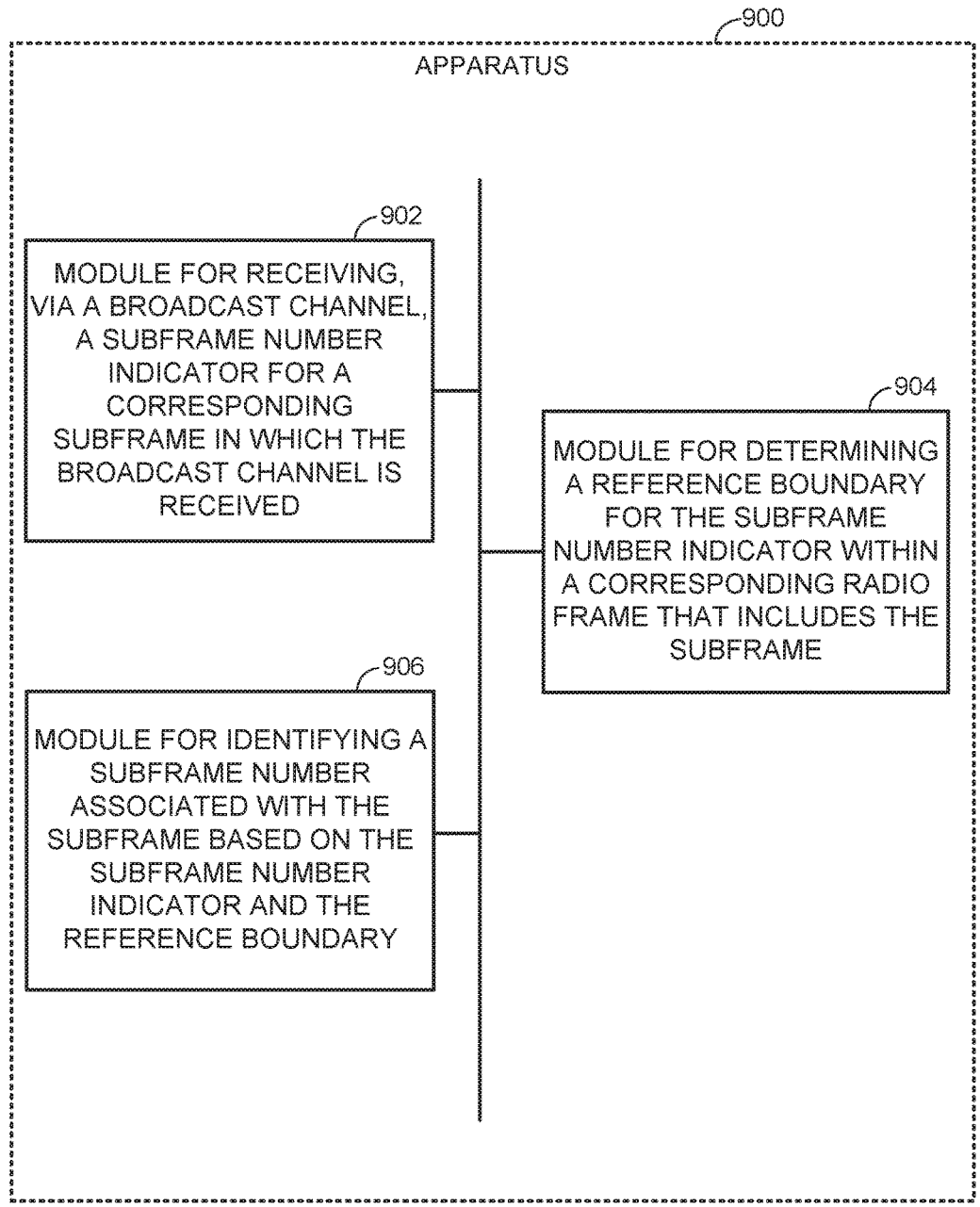
FIG. 9 illustrates an example apparatus represented as a series of interrelated functional modules.

FIG. 9 illustrates an example apparatus for implementing the broadcast channel manager 122 represented as a series of interrelated functional modules. In the illustrated example, the apparatus 900 includes a module for receiving 902, a module for determining 904, and a module for identifying 906.

The module for receiving 902 may be configured to receive, via a broadcast channel, a subframe number indicator for a corresponding subframe in which the broadcast channel is received. The module for determining 904 may be configured to determine a reference boundary for the subframe number indicator within a corresponding radio frame that includes the subframe. The module for identifying 906 may be configured to identify a subframe number associated with the subframe based on the subframe number indicator and the reference boundary.

Figure 10:
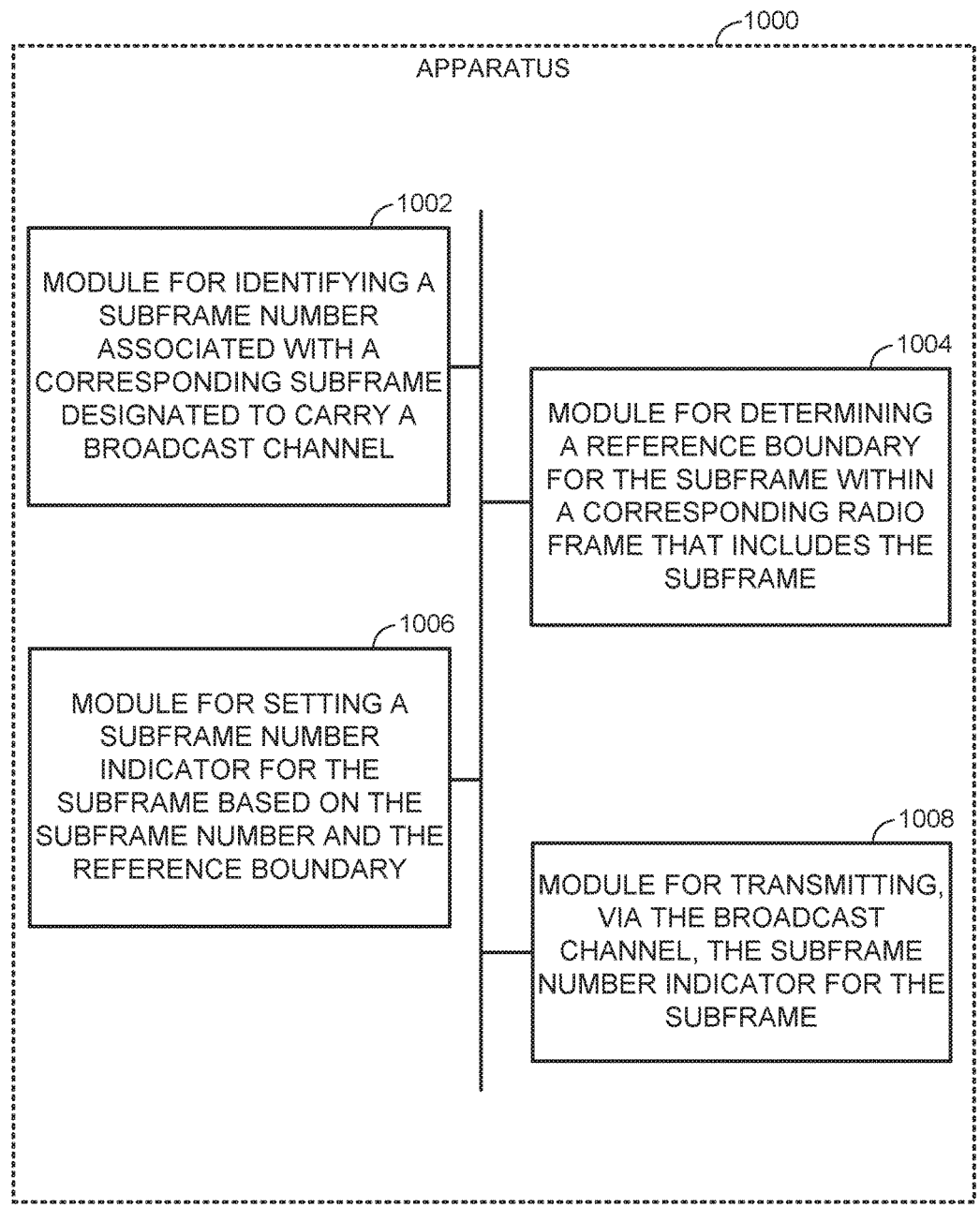
FIG. 10 illustrates another example apparatus represented as a series of interrelated functional modules.

FIG. 10 illustrates an example apparatus for implementing the broadcast channel manager 112 represented as a series of interrelated functional modules. In the illustrated example, the apparatus 1000 includes a module for identifying 1002, a module for determining 1004, a module for setting 1006, and a module for transmitting 1008.

The module for identifying 1002 may be configured to identify a subframe number associated with a corresponding subframe designated to carry a broadcast channel. The module for determining 1004 may be configured to determine a reference boundary for the subframe within a corresponding radio frame that includes the subframe. The module for setting 1006 may be configured to set a subframe number indicator for the subframe based on the subframe number and the reference boundary. The module for transmitting 1008 may be configured to transmit, via the broadcast channel, the subframe number indicator for the subframe.

The functionality of the modules of FIGS. 9-10 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 9-10, as well as other components and functions described herein, may be implemented using any suitable means. Such means also may be implemented, at least in part, using corresponding structure as taught herein. For example, the components described above in conjunction with the "module for" components of FIGS. 9-10 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well in sequences of actions that may be represented by pseudocode. For example, the components and functions represented by FIGS. 9-10 may include code for performing a LOAD operation, a COMPARE operation, a RETURN operation, an IF-THEN-ELSE loop, and so on.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A communication method, comprising:
receiving, at an access terminal via a broadcast channel, a subframe number indicator for a corresponding subframe in which the broadcast channel is received at the access terminal, wherein the broadcast channel is received within a Discovery Reference Signal (DRS) Transmission Window (DTxW), and wherein the DTxW spans a number of subframes that is greater than a number of subframes that can be uniquely conveyed by the subframe number indicator;
determining, at the access terminal, a reference boundary for the subframe number indicator within a corresponding radio frame that includes the subframe, wherein the reference boundary comprises a start of a half frame of a system frame; and
identifying, at the access terminal, a subframe number associated with the subframe, wherein identifying the subframe number comprises interpreting a value of the subframe number indicator with respect to the reference boundary.

2. The method of claim 1, wherein the value of the subframe number indicator is interpreted as an offset within the radio frame with respect to the reference boundary.

3. The method of claim 1, wherein the determining comprises:
receiving a Secondary Synchronization Signal (SSS) short code; and
determining the reference boundary based on a value of the SSS short code.

4. The method of claim 3, wherein the determining further comprises:
setting the reference boundary to a first subframe within a first portion of the radio frame based on a first value of the SSS short code; and
setting the reference boundary to a second subframe within a second portion of the radio frame based on a second value of the SSS short code.

5. The method of claim 4, wherein, for a numbering of subframes within the radio frame of 0 through 9, the first subframe corresponds to subframe 0 and the second subframe corresponds to subframe 5.

6. The method of claim 1, wherein the subframe number indicator corresponds to three bits and the DTxW spans more than eight subframes.

7. The method of claim 1, further comprising adjusting one or more timing parameters based on the identified subframe number.

8. The method of claim 7, further comprising detecting a Primary Synchronization Signal (PSS) and a Secondary Synchronization Signal (SSS), wherein the adjusting is further based on the detecting.

9. An apparatus, comprising:
at least one transceiver configured to receive, via a broadcast channel, a subframe number indicator for a corresponding subframe in which the broadcast channel is received, wherein the broadcast channel is received within a Discovery Reference Signal (DRS) Transmission Window (DTxW), and wherein the DTxW spans a number of subframes that is greater than a number of subframes that can be uniquely conveyed by the subframe number indicator;
at least one processor; and
at least one memory coupled to the at least one processor, the at least one processor and the at least one memory being configured to:
determine a reference boundary for the subframe number indicator within a corresponding radio frame that includes the subframe, wherein the reference boundary comprises a start of a half frame of a system frame, and
identify a subframe number associated with the subframe by interpreting a value of the subframe number indicator with respect to the reference boundary.

10. The apparatus of claim 9, wherein the value of the subframe number indicator is interpreted as an offset within the radio frame with respect to the reference boundary.

11. The apparatus of claim 9, wherein:
the at least one transceiver is further configured to receive a Secondary Synchronization Signal (SSS) short code; and
the at least one memory and the at least one processor are further configured to determine the reference boundary based on a value of the SSS short code.

12. The apparatus of claim 11, wherein the at least one memory and the at least one processor are further configured to:
set the reference boundary to a first subframe within a first portion of the radio frame based on a first value of the SSS short code; and
set the reference boundary to a second subframe within a second portion of the radio frame based on a second value of the SSS short code.

13. The apparatus of claim 12, wherein, for a numbering of subframes within the radio frame of 0 through 9, the first subframe corresponds to subframe 0 and the second subframe corresponds to subframe 5.

14. The apparatus of claim 9, wherein the subframe number indicator corresponds to three bits and the DTxW spans more than eight subframes.

15. The apparatus of claim 9, wherein the at least one memory and the at least one processor are further configured to adjust one or more timing parameters based on the identified subframe number.

16. The apparatus of claim 15, wherein:
the at least one transceiver is further configured to detect a Primary Synchronization Signal (PSS) and a Secondary Synchronization Signal (SSS); and the at least one memory and the at least one processor are further configured to determine adjust the one or more timing parameters based on the detecting.

17. An apparatus, comprising:
means for receiving, via a broadcast channel, a subframe number indicator for a corresponding subframe in which the broadcast channel is received, wherein the broadcast channel is received within a Discovery Reference Signal (DRS) Transmission Window (DTxW), and wherein the DTxW spans a number of subframes that is greater than a number of subframes that can be uniquely conveyed by the subframe number indicator;
means for determining a reference boundary for the subframe number indicator within a corresponding radio frame that includes the subframe, wherein the reference boundary comprises a start of a half frame of a system frame; and
means for identifying a subframe number associated with the subframe, wherein the means for identifying the subframe number comprises means for interpreting a value of the subframe number indicator with respect to the reference boundary.

18. The apparatus of claim 17, wherein the value of the subframe number indicator is interpreted as an offset within the radio frame with respect to the reference boundary.

19. The apparatus of claim 17, wherein the means for determining comprises:
means for receiving a Secondary Synchronization Signal (SSS) short code; and
means for determining the reference boundary based on a value of the SSS short code.

20. The apparatus of claim 19, wherein the means for determining further comprises:
means for setting the reference boundary to a first subframe within a first portion of the radio frame based on a first value of the SSS short code; and
means for setting the reference boundary to a second subframe within a second portion of the radio frame based on a second value of the SSS short code.

21. The apparatus of claim 20, wherein, for a numbering of subframes within the radio frame of 0 through 9, the first subframe corresponds to subframe 0 and the second subframe corresponds to subframe 5.

22. A non-transitory computer-readable medium comprising code, which, when executed by at least one processor, causes the at least one processor to perform operations for communication, the non-transitory computer-readable medium comprising:
code for receiving, via a broadcast channel, a subframe number indicator for a corresponding subframe in which the broadcast channel is received, wherein the broadcast channel is received within a Discovery Reference Signal (DRS) Transmission Window (DTxW), and wherein the DTxW spans a number of subframes that is greater than a number of subframes that can be uniquely conveyed by the subframe number indicator;
code for determining a reference boundary for the subframe number indicator within a corresponding radio frame that includes the subframe, wherein the reference boundary comprises a start of a half frame of a system frame; and
code for identifying a subframe number associated with the subframe, wherein the code for identifying the subframe number comprises code for interpreting a value of the subframe number indicator with respect to the reference boundary.

23. The non-transitory computer-readable medium of claim 22, wherein the value of the subframe number indicator is interpreted as an offset within the radio frame with respect to the reference boundary.

24. The non-transitory computer-readable medium of claim 22, wherein the code for determining comprises:
code for receiving a Secondary Synchronization Signal (SSS) short code; and
code for determining the reference boundary based on a value of the SSS short code.

25. The non-transitory computer-readable medium of claim 24, wherein the code for determining further comprises:
code for setting the reference boundary to a first subframe within a first portion of the radio frame based on a first value of the SSS short code; and
code for setting the reference boundary to a second subframe within a second portion of the radio frame based on a second value of the SSS short code.

26. The non-transitory computer-readable medium of claim 25, wherein, for a numbering of subframes within the radio frame of 0 through 9, the first subframe corresponds to subframe 0 and the second subframe corresponds to subframe 5.

27. A communication method, comprising:
identifying, at an access point, a subframe number associated with a corresponding subframe designated to carry a broadcast channel;
determining, at the access point, a reference boundary for the subframe within a corresponding radio frame that includes the subframe, wherein the reference boundary comprises a start of a half frame of a system frame;
setting, by the access point, a value of a subframe number indicator for the subframe based on the subframe number with respect to the reference boundary; and
transmitting, by the access point via the broadcast channel, the subframe number indicator for the subframe, wherein the broadcast channel is transmitted within a Discovery Reference Signal (DRS) Transmission Window (DTxW), and wherein the DTxW spans a number of subframes that is greater than a number of subframes that can be uniquely conveyed by the subframe number indicator.

28. The method of claim 27, wherein the value of the subframe number indicator is set as an offset within the radio frame with respect to the reference boundary.

29. The method of claim 27, wherein the determining comprises setting the reference boundary to a first subframe within a first portion of the radio frame or a second subframe within a second portion of the radio frame.

30. The method of claim 29, wherein, for a numbering of subframes within the radio frame of 0 through 9, the first subframe corresponds to subframe 0 and the second subframe corresponds to subframe 5.

31. The method of claim 27, wherein the subframe number indicator corresponds to three bits and the DTxW spans more than eight subframes.

32. An apparatus, comprising:
at least one processor;
at least one memory coupled to the at least one processor, the at least one processor and the at least one memory being configured to:
identify a subframe number associated with a corresponding subframe designated to carry a broadcast channel,
determine a reference boundary for the subframe within a corresponding radio frame that includes the subframe, wherein the reference boundary comprises a start of a half frame of a system frame, and set a value of a subframe number indicator for the subframe based on the subframe number with respect to the reference boundary; and at least one transceiver configured to transmit, via the broadcast channel, the subframe number indicator for the subframe, wherein the broadcast channel is transmitted within a Discovery Reference Signal (DRS) Transmission Window (DTxW), and wherein the DTxW spans a number of subframes that is greater than a number of subframes that can be uniquely conveyed by the subframe number indicator.

33. The apparatus of claim 32, wherein the value of the subframe number indicator is set as an offset within the radio frame with respect to the reference boundary.

34. The apparatus of claim 32, wherein the at least one processor and the at least one memory are further configured to set the reference boundary to a first subframe within a first portion of the radio frame or a second subframe within a second portion of the radio frame.

35. The apparatus of claim 34, wherein, for a numbering of subframes within the radio frame of 0 through 9, the first subframe corresponds to subframe 0 and the second subframe corresponds to subframe 5.

36. The apparatus of claim 32, wherein the subframe number indicator corresponds to three bits and the DTxW spans more than eight subframes.

37. An apparatus, comprising:

means for identifying a subframe number associated with a corresponding subframe designated to carry a broadcast channel;

means for determining a reference boundary for the subframe within a corresponding radio frame that includes the subframe, wherein the reference boundary comprises a start of a half frame of a system frame;

means for setting a value of a subframe number indicator for the subframe based on the subframe number with respect to the reference boundary; and means for transmitting, via the broadcast channel, the subframe number indicator for the subframe, wherein the broadcast channel is transmitted within a Discovery Reference Signal (DRS) Transmission Window (DTxW), and wherein the DTxW spans a number of subframes that is greater than a number of subframes that can be uniquely conveyed by the subframe number indicator.

38. The apparatus of claim 37, wherein the value of the subframe number indicator is set as an offset within the radio frame with respect to the reference boundary.

39. The apparatus of claim 37, wherein the means for determining comprises means for setting the reference boundary to a first subframe within a first portion of the radio frame or a second subframe within a second portion of the radio frame.

40. The apparatus of claim 39, wherein, for a numbering of subframes within the radio frame of 0 through 9, the first subframe corresponds to subframe 0 and the second subframe corresponds to subframe 5.

41. A non-transitory computer-readable medium comprising code, which, when executed by at least one processor, causes the at least one processor to perform operations for communication, the non-transitory computer-readable medium comprising:

code for identifying a subframe number associated with a corresponding subframe designated to carry a broadcast channel;

code for determining a reference boundary for the subframe within a corresponding radio frame that includes the subframe, wherein the reference boundary comprises a start of a half frame of a system frame;

code for setting a value of a subframe number indicator for the subframe based on the subframe number with respect to the reference boundary; and code for transmitting, via the broadcast channel, the subframe number indicator for the subframe, wherein the broadcast channel is transmitted within a Discovery Reference Signal (DRS) Transmission Window (DTxW), and wherein the DTxW spans a number of subframes that is greater than a number of subframes that can be uniquely conveyed by the subframe number indicator.

42. The non-transitory computer-readable medium of claim 41, wherein the value of the subframe number indicator is set as an offset within the radio frame with respect to the reference boundary.

43. The non-transitory computer-readable medium of claim 41, wherein the code for determining comprises code for setting the reference boundary to a first subframe within a first portion of the radio frame or a second subframe within a second portion of the radio frame.

44. The non-transitory computer-readable medium of claim 43, wherein, for a numbering of subframes within the radio frame of 0 through 9, the first subframe corresponds to subframe 0 and the second subframe corresponds to subframe 5.

* * * * *